UNITED STATES PATENT OFFICE.

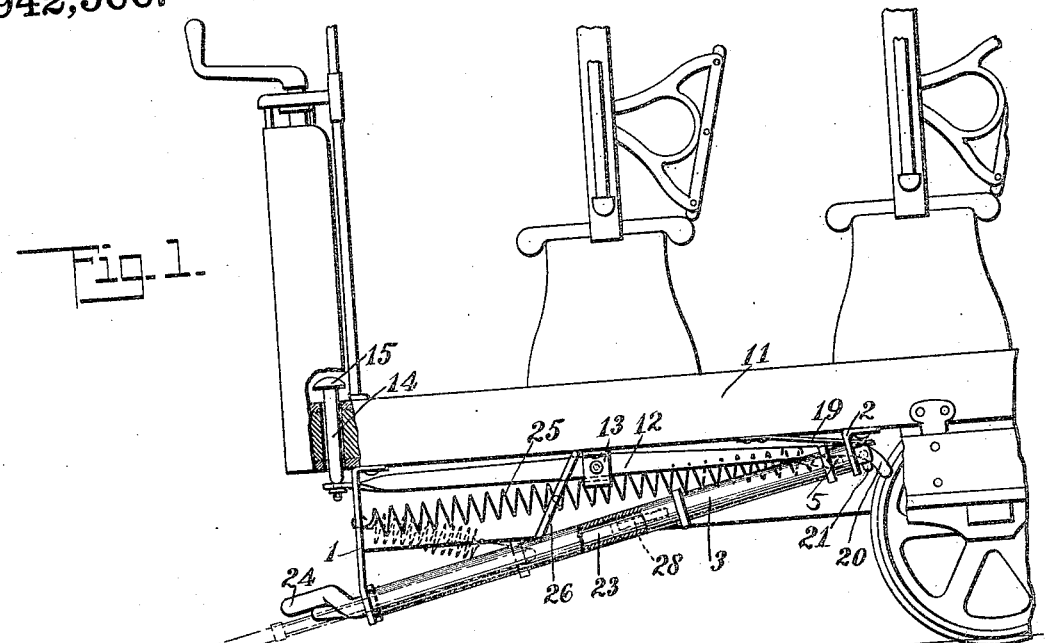
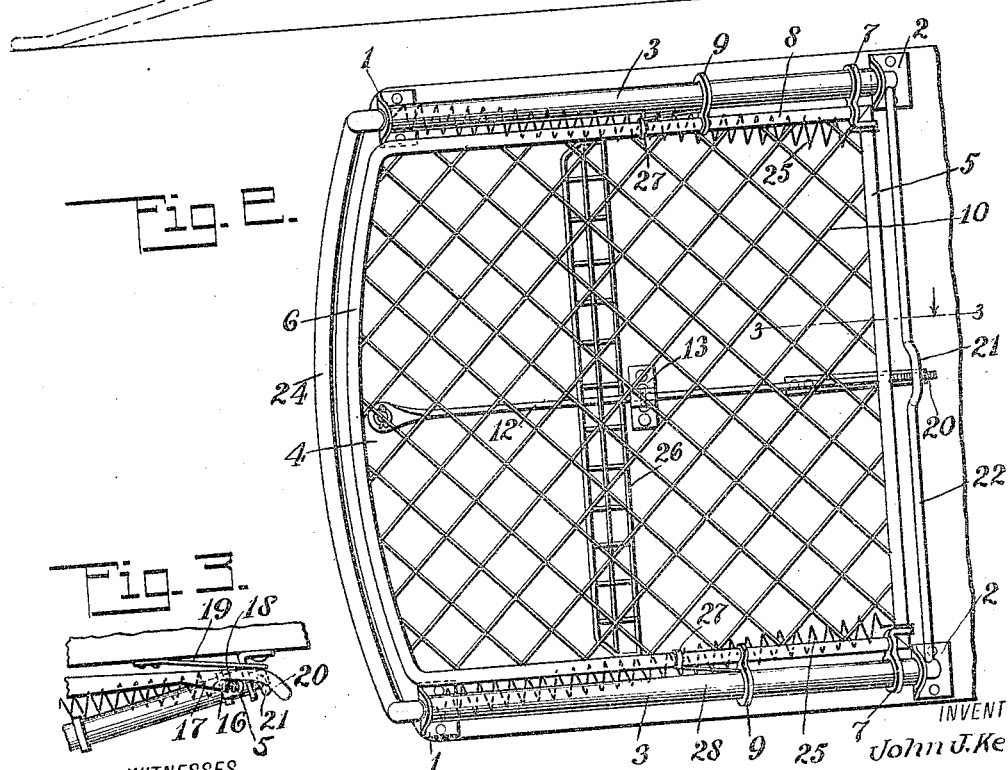
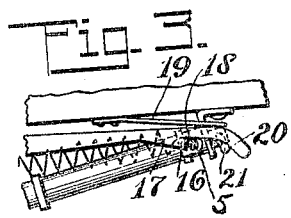

JOHN JOSEPH KELLY, OF NEW YORK, N. Y.

CAR-FENDER.

942,566.   Specification of Letters Patent.   Patented Dec. 7, 1909.

Application filed April 15, 1909. Serial No. 490,036.

*To all whom it may concern:*

Be it known that I, JOHN JOSEPH KELLY, a citizen of the United States, and a resident of the city of New York, borough of Manhattan, in the county and State of New York, have invented a new and Improved Car-Fender, of which the following is a full, clear, and exact description.

This invention relates to car fenders such as are attached at the forward end of street cars or trolley cars for the purpose of saving persons from being run over.

The object of the invention is to produce a fender of this class which is simple in construction, the cradle of which is normally disposed in an inoperative position under the forward end of the car, but comprising a trip frame which when touched by the body, automatically releases the cradle so that it advances so as to present its forward edge under the body. In addition to this the construction comprises an arrangement whereby the cradle can be released directly by the motorman.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of the forward end of the car provided with my fender, certain parts being broken away and shown in section, this view showing the fender in its normal inoperative position in full lines, but representing it in dotted lines as extended; Fig. 2 is a plan of the fender looking from the under side upwardly; and Fig. 3 is a cross section, on the line 3—3 in Fig. 2, further illustrating the releasing means for the fender cradle.

Referring more particularly to the parts, 1, 1 represent brackets which are attached at each side of the car at the forward end, and similar brackets 2, 2, are attached to the under side of the car toward the rear. These brackets 2, 2, however, are so much shorter than the forward brackets as to enable them to support tubular guide bars 3 in an inclined position, the forward ends of the guide bars 3 being depressed, as shown. Between the guide bars a cradle 4 is mounted. This cradle is in the form of a substantially square or rectangular frame 5, the forward bar 6 of which is slightly curved forwardly so as to form a bow. At the rear corners of the frame 5, guide rings 7 are attached thereto and these guide rings slide freely on the guide bars 3, as will be readily understood. At an intermediate point on the side bars 8 of the frame 5, similar guide rings 9 are provided, which slide on the guide bars and these guide rings 7 and 9 support the cradle on the guide bars. The body of the cradle is formed of wire net 10, or similar material.

On the under side of the car floor 11, I provide a trip lever 12 which is disposed centrally, as indicated, and pivotally attached near its middle point to a bracket 13. At its forward end a vertically movable plunger or pin 14 is attached, the upper end of which projects above the floor and is formed with a head 15 which is adapted to be pressed downwardly by the motorman's foot. Near its rear extremity the lower edge of the trip lever 12 is provided with a downwardly projecting tooth 16, and this tooth presents an inclined face 17 disposed toward the front end of the car, and an abrupt shoulder 18 disposed toward the rear. The rear end of this lever is resiliently pressed downwardly by means of a spring 19 which is attached to the under side of the car floor, as indicated in Fig. 3. Beyond the tooth 16, the rear end of the lever is formed into a downwardly inclined finger 20. The inclined lower edge of this finger 20 normally rests against a downwardly offset extension 21 which is formed at the middle point of a cross bar 22 which extends transversely of the car, as indicated in Fig. 2. This cross bar 22 constitutes the rear end of the trip frame. This trip frame comprises side bars 23 which extend completely through the guide bars 3, it being understood that the ends of the guide bars 3 are open. The forward ends of the side bars 23 are united across the front of the fender by an integral bow 24 which is slightly offset upwardly, as shown. By offsetting this bow upwardly in the manner suggested, clearance is made for the forward edge of the cradle frame when it advances. It should be understood that the tooth 16 normally detains the cradle in its rearmost position, that is, in a folded or inoperative position under the car floor.

In order to advance the fender cradle automatically when released, I provide coil springs 25 which are disposed at each side, as indicated. The forward end of each spring is attached to one of the forward brackets 1, and the rear end is attached to the rear end of the frame 5. At an intermediate point over the cradle and under the floor of the car, a guard frame 26 is provided which prevents a body from rolling over the rear edge of the cradle when it has been projected forwardly. In this connection, referring to Fig. 1, it will be noted that when the cradle has sprung forwardly, the rear edge of the cradle frame will then lie near the lower edge of the guard frame 26.

Just forwardly of the forward guide rings 9, the side bars 8 of the cradle frame are provided with rigid collars 27, respectively, and these collars are provided with leaf springs 28 which extend rearwardly, and the rear ends of these springs are pressed resiliently against the inner side faces of the guide bars 3. When the cradle has been projected forwardly, as indicated by the dotted lines in Fig. 1, these springs pass beyond the forward brackets 1 and their rear extremities engage the forward sides of these brackets so as to lock the cradle of the fender in this position. After the fender has been operated the cradle may be released so as to replace it, simply by releasing these detent springs 28.

The mode of operation of the fender will now be briefly described: First as to its automatic operation: With the parts in the position shown in Fig. 1, if a body strikes the bow 24, which is disposed slightly forwardly of the bow 6 of the cradle frame, the entire trip frame will be moved rearwardly, the side bars 23 sliding in the tubular guide bars 3. As this rearward movement occurs, the rear cross bar 22 moves rearwardly and operates upon the inclined finger 20 so as to raise the rear end of the lever 12. This disengages the bar 5 of the cradle frame from the tooth 16, and the springs 25 then act upon the cradle so as to advance it. The cradle then slides forwardly on the guide bars 3, and in an inclined direction. The amount of forward movement is sufficient to bring the forward edge of the cradle frame near the level of the rails, as shown in Fig. 1. When the motorman has sufficient time to act in case of an accident, he can release the cradle himself by depressing the plunger 14. This simply raises the rear end of the trip lever 12 without moving the trip frame. As soon as the rear end of the lever rises sufficiently to disengage the tooth 16 from the cradle frame, the springs of the cradle frame advance it as described above. In this way it will be observed that the fender can operate effectively either automatically or directly.

Having thus described my invention, I claim as new and desire to secure by Letters Patent,—

1. In a car fender, in combination, a cradle, means for supporting said cradle in an inclined position under the forward end of the car, means tending to advance said cradle, means for guiding said cradle to advance in a downwardly inclined direction, a trip frame guided longitudinally of said cradle and normally projecting forwardly of said cradle, and means for normally detaining said cradle, said trip frame affording means for releasing said cradle.

2. In a car fender, in combination, a pair of inclined guide bars mounted under the forward end of the car and depressed toward their forward extremities, a cradle having a frame guided on said guide bars, springs tending to advance said cradle, means for normally detaining said cradle in a rearmost position, a trip frame having a bar extending across the front of said cradle and affording means when struck for releasing said cradle.

3. In a car fender, in combination, a pair of inclined guide bars disposed under the forward end of the car and depressed at their forward extremities, a cradle having a frame guided on said guide bars and adapted to slide forwardly thereupon, springs connected with said cradle frame and adapted to advance the same, a member engaging said frame and normally detaining said frame in its rearmost position, and a trip frame guided on said guide bars and affording means for actuating said member to release said cradle.

4. In a car fender, in combination, a pair of inclined tubular guide bars having their forward ends depressed, a cradle having a frame guided on said guide bars, springs connected with said cradle frame and tending to advance the same, a member normally engaging said cradle frame and adapted to detain the same in its rearmost position, and a trip frame projecting at its forward end before said cradle frame and having side bars sliding in said tubular guide bars, said trip frame being in engagement with said member and affording means for actuating said member to release said cradle therefrom.

5. In a car fender, in combination, a pair of inclined guide bars mounted under the forward end of the car and depressed at their forward extremities, a cradle having a frame guided on said guide bars, springs tending to advance said cradle, a lever engaging said cradle frame and normally adapted to detain said cradle in its rearmost position, and a trip frame projecting before said cradle and engaging said lever, said trip frame affording means for actuating said lever to release said cradle.

6. In a car fender, in combination, a pair of inclined guide bars mounted under the forward end of the car and depressed at their forward extremities, a cradle having a frame guided on said guide bars, springs tending to advance said cradle, a lever engaging said cradle frame and normally adapted to detain said cradle in its rearmost position, a trip frame projecting before said cradle and engaging said lever, said trip frame affording means for actuating said lever to release said cradle, and means mounted at the motorman's position connecting with said lever for actuating the same directly.

7. In a car fender, in combination, a cradle, springs tending to advance said cradle, means for guiding said cradle in advancing, said cradle having a frame, a lever mounted under the car body and engaging said cradle frame to detain the same, said lever having an inclined finger, a trip frame projecting before said cradle and having a bar engaging said finger to release the same, and means for actuating said lever directly from the motorman's position.

8. In a car fender, in combination, tubular guide bars, means for supporting said guide bars with their forward ends depressed, a cradle having a frame guided on said guide bars, springs connected with said cradle and tending to advance the same, a lever having a detent tooth on the lower edge thereof engaging said cradle frame and normally detaining the same, means for actuating said lever from the motorman's position, said lever having a downwardly inclined finger, and a trip frame guided in said guide bars and projecting at its forward end before said cradle frame, said trip frame having a cross bar engaging said finger and adapted to raise the rear end of said lever when said trip frame is struck.

9. In a car fender, in combination, a pair of inclined guide bars mounted under the forward end of the car and depressed at their forward extremities, a cradle having a frame, guide rings attached to the sides of said frame near the rear end thereof and sliding on said guide bars, springs tending to advance said cradle to project the same before the car, a trip frame projecting before said cradle, means for normally detaining said cradle, and means actuated by said trip frame for releasing said cradle.

10. In a car fender, in combination, a pair of forward brackets, a pair of rear brackets, parallel guide bars attached at their ends to said brackets and depressed at their forward ends, a cradle having a frame, guide rings attached to said frame and sliding on said guide bars, springs tending to advance said cradle, means for normally detaining said cradle, means for releasing said cradle, and resilient members carried on the sides of said frame and adapted to engage said forward brackets when the cradle is advanced to prevent the return of the cradle.

11. In a car fender, in combination, a pair of oppositely disposed inclined guide bars mounted under the car body, a cradle having a frame guided on said guide bars, a fixed guard frame under the car body at an intermediate point of said cradle, and means for advancing said cradle so as to slide it bodily under said guard frame and to extend the same before the car body, said guard frame forming a guard at the rear edge of said cradle when in its forwardly extended position.

In testimony whereof I have signed my name to this specification in the presence of two subscribing witnesses.

JOHN JOSEPH KELLY.

Witnesses:
 ALTON A. SAUNDERS,
 GEORGE W. MURPHY.